(12) United States Patent
Krishnasami et al.

(10) Patent No.: US 11,792,633 B2
(45) Date of Patent: Oct. 17, 2023

(54) DEVICE AUTHENTICATION VERIFICATION FOR DEVICE REGISTRATION

(71) Applicant: T-Mobile USA, Inc., Bellevue, WA (US)

(72) Inventors: Vasu Krishnasami, Bellevue, WA (US); Robert Kondakjian, Snohomish, WA (US); Chris Jensen, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 147 days.

(21) Appl. No.: 17/330,317

(22) Filed: May 25, 2021

(65) Prior Publication Data
US 2022/0386099 A1 Dec. 1, 2022

(51) Int. Cl.
| | | |
|---|---|---|
| H04W 4/00 | (2018.01) | |
| H04W 8/04 | (2009.01) | |
| H04W 48/16 | (2009.01) | |
| H04W 76/11 | (2018.01) | |
| H04W 12/06 | (2021.01) | |

(52) U.S. Cl.
CPC ............ *H04W 8/04* (2013.01); *H04W 12/06* (2013.01); *H04W 48/16* (2013.01); *H04W 76/11* (2018.02)

(58) Field of Classification Search
CPC ....... H04W 8/04; H04W 76/11; H04W 12/06; H04W 48/16; H04W 60/00; H04W 60/04
USPC ........................................................ 370/329
See application file for complete search history.

(56) References Cited

U.S. PATENT DOCUMENTS

2018/0160292 A1* 6/2018 Chastain ................. H04W 4/50
2020/0007538 A1* 1/2020 Mehta ................. H04W 12/122

* cited by examiner

*Primary Examiner* — Temica M Beamer
(74) *Attorney, Agent, or Firm* — Han Santos, PLLC

(57) ABSTRACT

A subscriber information entity of a home wireless carrier network may receive an authentication request for a user device from a network element of a partner wireless carrier network. The authentication request may include a network element identifier of the network element. An authentication response for the authentication request is then sent to the network element of the partner wireless carrier network. Further, the network element identifier of the network element is stored in a subscriber profile for the user device. A registration request for the user device is then received from a particular network element of a wireless carrier network, in which the registration request includes a corresponding network element identifier of the particular network element. A registration response to the particular network element of the wireless carrier network may be sent when the corresponding network element identifier matches the network element identifier.

20 Claims, 4 Drawing Sheets

DEVICE AUTHENTICATION VERIFICATION FOR DEVICE REGISTRATION

BACKGROUND

A subscriber device typically obtains wireless telecommunication services from its home wireless carrier network. However, if the subscriber device is roaming in a geographical area that is not served by the home wireless carrier network, the subscriber device may receive wireless telecommunication services from a partner wireless carrier network of the home wireless carrier network. For example, when the partner wireless carrier network detects the subscriber device on its network, the partner wireless carrier network may communicate with the home wireless carrier network via an authentication procedure to authenticate that the subscriber device is a valid subscriber device of the home wireless carrier network. Subsequently, the partner wireless carrier network may communicate with the home wireless carrier network via a registration procedure to obtain subscriber profile information associated with the subscriber device from the home wireless carrier network. For example, the partner wireless carrier network may send a registration request for the subscriber device to the home wireless carrier network. In turn, the home wireless carrier network may send a registration response that includes the subscriber profile information to the partner wireless carrier network. Subsequently, the subscriber profile information may be used by the partner wireless carrier network to determine whether the subscriber device is eligible to roam on the partner wireless carrier network, the appropriate type of services to provide to the subscriber device, and/or so forth.

However, current 3rd Generation Partnership Project (3GPP) standards do not mandate that a home wireless carrier network and its partner wireless carrier network must perform the authentication procedure for a subscriber device before performing the registration procedure. Similarly, the current 3GPP standards also do not provide a mechanism to check whether a registration request is preceded by an authentication request. As a result, a malicious entity who is impersonating the partner wireless carrier network may in some cases send a registration request regarding a subscriber device to the home wireless carrier network to obtain the subscriber profile information associated with the subscriber device from the home wireless carrier network. The malicious entity may then use the subscriber profile information for various nefarious purposes, such as falsely obtaining telecommunication services from the home wireless carrier network or a partner wireless carrier network, charging fictitious fees to the mobile network operator (MNO) of the home wireless carrier network, making fraudulent billing charges to a subscriber account at the home wireless carrier network that is associated with the subscriber device, and/or so forth. In some instances, a legitimate subscriber of the home wireless carrier network may also face denial of service as the home wireless carrier network is only capable of servicing one subscriber profile associated with the legitimate subscriber, regardless of whether the subscriber profile is authentic or falsified.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
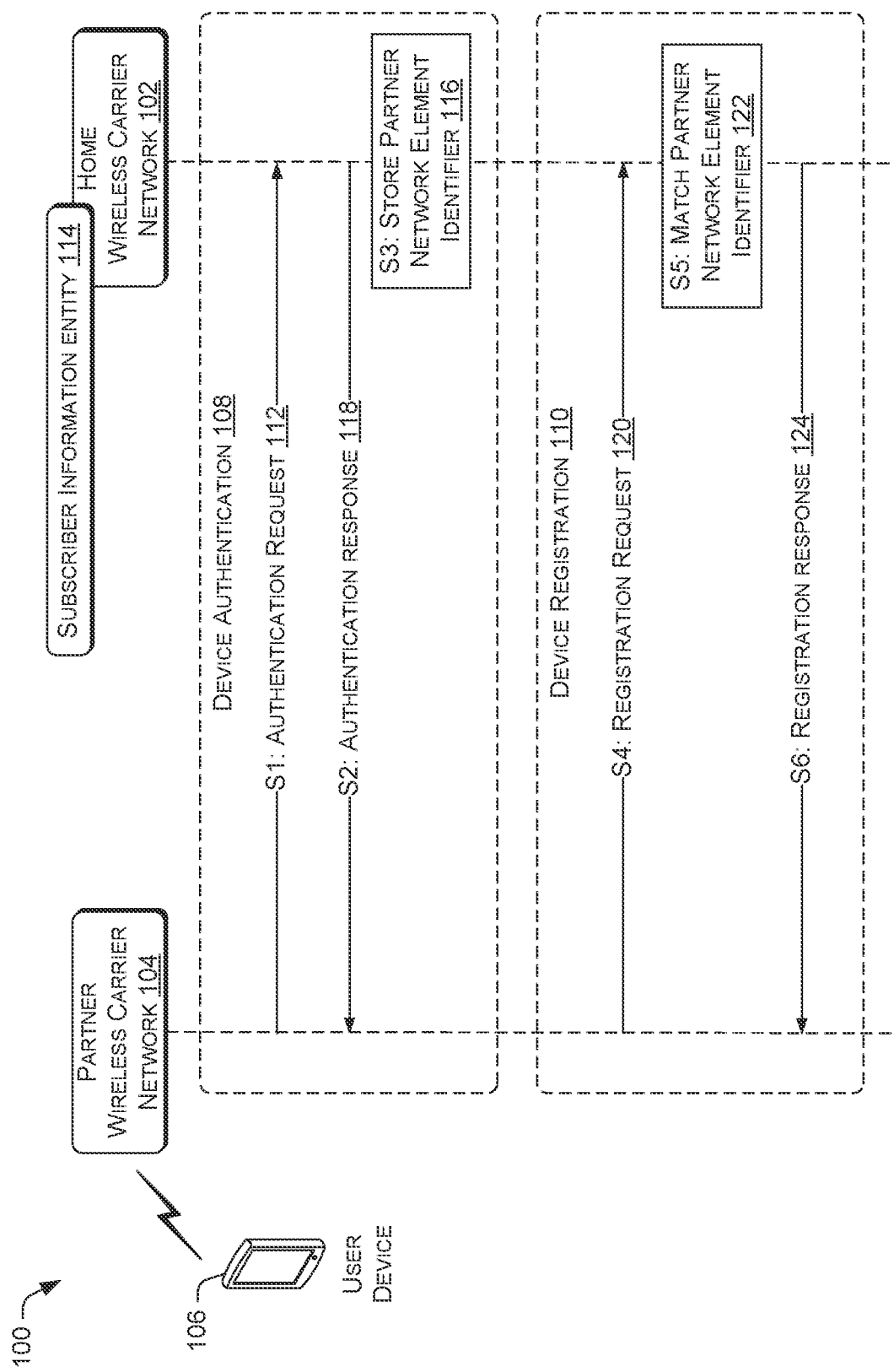
FIG. 1 illustrates an example architecture that enables a home wireless carrier network to perform device authentication verification for device registration.

This disclosure is directed to techniques that enable a subscriber information entity of a home wireless carrier network that receives that a registration request for a user device from a network element of a partner wireless carrier network to verify that the network element had previously completed a successful authentication procedure for the user device with the home wireless carrier network. If the network element is verified to have previously successfully completed the authentication procedure with the home wireless carrier network for the user device, the subscriber information entity may send a registration response that includes the subscriber profile information associated with the user device to the network element. Otherwise, the subscriber information entity may reject the registration request from the network element.

In some instances, the network element may support 2G or 3G wireless telecommunication, such as a Mobile Switch Center (MSC), a Visitor Location Register (VLR), or a Serving General Packet Radio Service Support Node (SGSN). In such instances, the subscriber information entity that performs the authentication verification may be a Home Location Register (HLR). In other instances, the network element may support 4G or LTE wireless telecommunication, such as a Mobile Management Entity (MME). In such instances, the subscriber information entity that performs the authentication verification may be a Home Subscriber Server (HSS).

In some embodiments, the subscriber information entity may receive an authentication request for the user device from the network element, in which the authentication request includes a first network element identifier of the network element. In turn, the subscriber information entity may perform an authentication to determine whether the user device is a valid subscriber device of the home wireless carrier network, and then send an authentication response for the authentication request to the network element of the partner wireless carrier network. Thus, if the subscriber information entity is able to successfully authenticate the user device, the subscriber information entity may store the first network element identifier of the network element in a subscriber profile maintained by the subscriber information entity for the user device.

Subsequently, the subscriber information entity may receive a registration request for the user device from a particular network element of a wireless carrier network, in which the registration request includes a second network element identifier of the particular network element. Thus, if the subscriber information entity determines that the second network element identifier matches the first network element identifier of the network element stored in the subscriber profile, the subscriber information entity may send a registration response to the particular network element of the wireless carrier network, in which the registration response includes subscriber profile information associated with the user device. On the other hand, if the subscriber information entity determines that the second network element identifier does not match the first network element identifier of the network element stored in the subscriber profile, the subscriber information entity may reject the registration request.

In other embodiments, instead of determining whether the second network element identifier matches the first network element identifier of the network element stored in the subscriber profile, the subscriber information entity may determine whether the second network element identifier at least partially matches the first network element identifier of the network element. Thus, if the subscriber information entity determines that the second network element identifier at least partially matches the first network element identifier of the network element stored in the subscriber profile, the subscriber information entity may send a registration response to the particular network element of the wireless carrier network, in which the registration response includes the subscriber profile information associated with the user device. This use of partial matching may accommodate the sharing of authentication responses received from a HLR or a HSS across multiple network elements by some partner wireless carrier networks. For example, a pool of MSCs, VLRs, and/or SGSNs may share keys instead of the network elements sending individual authentication requests when a subscriber moves to different locations while still being served by the partner wireless carrier network. On the other hand, if the subscriber information entity determines that the second network element identifier does not at least partially match the first network element identifier of the network element stored in the subscriber profile, the subscriber information entity may reject the registration request.

In one example, each of the first network element identifier and the second network element identifier may be a global title that includes a country code, a network operator code, and a network element code. Accordingly, the subscriber information entity may determine that there is a partial match between the first and second network element identifiers when the respective country codes match and the respective network operator codes match, even without a matching of the respective network element codes. In another example, each of the first network element identifier and the second network element identifier may be a host identifier that includes a realm name and a network element name. Accordingly, the subscriber information entity may determine that there is a partial match between the first and second network element identifiers when the respective realm names match even without a matching of the respective element names.

In some alternative embodiments, the subscriber information entity may not initially reject the registration request when the second network element identifier of the registration request for the user device fails to match or at least partially match the first network element identifier of the authentication request for the user device. Instead, the subscriber information entity may determine whether the network identifier information included in the second network element identifier identifies the wireless carrier network as a trusted partner wireless carrier network. For example, the network identifier information may be the network operator code in a global title or the realm name in a host identifier. The network identifier information may be compared by the subscriber information entity to a list of wireless carrier network identities belonging to trusted partner wireless carrier networks. Accordingly, if the subscriber information entity determines from the network identifier information of the second network element identifier that the registration request originated from a trusted partner wireless carrier network, the subscriber information entity may send a registration response to the particular network element of the wireless carrier network. Otherwise, the subscriber information entity may reject the registration request.

The performance of such device authentication verification for device registration may prevent a malicious entity who is impersonating a partner wireless carrier network from sending a fake registration request to a home wireless carrier network to deceptively obtain the subscriber profile information associated with a user device from the home wireless carrier network. Accordingly, the ability of a malicious entity to use the deceptively obtained subscriber profile information for various nefarious purposes, such as falsely obtaining telecommunication services from a partner wireless carrier network, charge fictitious fees to the MNO of the home wireless carrier network, make fraudulent billing charges to a subscriber account at the home wireless carrier network that is associated with the subscriber device, and/or so forth, may be reduced or eliminated. The techniques described herein may be implemented in a number of ways. Example implementations are provided below with reference to the following figures.

Example Architecture

FIG. 1 illustrates an example architecture 100 that enables a home wireless carrier network 102 to perform device authentication verification for device registration. The home wireless carrier network 102 may exchange user device authentication and registration communications with a partner wireless carrier network 104. The home wireless carrier network 102 is the default network that provides telecommunication services to a user device 106. For example, the user device 106 may be a smartphone, a feature phone, a tablet computer, a laptop computer, a smartwatch, or some other computing device that is capable of communicating with other devices via a wireless carrier network. In various embodiments, each of the home wireless carrier network 102 and the partner wireless carrier network 104 may include a core network and a radio access network. The radio access network may include multiple base stations. Each base station may include a base transceiver system (BTS) that communicates via an antenna system over an air-link with one or more user devices that are within range. The BTS may send radio communication signals to user devices and receive radio communication signals from user devices. The base stations may provide corresponding network cells that deliver telecommunication and data communication coverage to user devices, such as the user device 106. The user devices may include a smartphone, a tablet computer, an embedded computer system, or any other device that is capable of using the wireless communication services that are provided by the wireless carrier network.

The core networks of the home wireless carrier network 102 and the partner wireless carrier network 104 may use their respective network cells to provide wireless communication services to the user devices. Each of the core networks may include components that support voice traffic, as well as data traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. Thus, the network elements in a core network that handles 2G or 3G wireless telecommunication may include the MSC, a Visitor Location Register (VLR), or a Serving General Packet Radio Service Support Node (SGSN). Each of these network elements may use information stored in a subscriber information entity in the form of a home location register (HLR) to perform their functions, in which the HLR is responsible for providing subscriber profile and authentication information. In various embodiments, the MSC, VLR, and the SGSN may communicate with the HLR via the Global System for Mobile Communications (GSM) Mobile Application Part (MAP) protocol.

Each of the core networks may further include components that support 4G/LTE and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers. The EPC may include a network element in the form of a Mobility Management Entity (MME). The MME may handle paging, authentication, and registration of user devices, as well as the routing of data and voice communications through selected gateways. For example, the gateway may be a Packet Data Network Gateway (PGW) or some other equivalent gateway. Each of the core networks may further include a subscriber information entity in the form of a Home Subscriber Server (HSS), in which the HSS is responsible for providing subscriber profile and authentication information. In various embodiments, the MME may communicate with the HSS via the Diameter protocol.

In various embodiments, the partner wireless carrier network 104 may initially authenticate the user device 106 during a device authentication procedure 108, and then register the user device 106 during a device registration procedure 110. During the device authentication procedure 108, the partner wireless carrier network 104 may send an authentication request 112 for the user device 106 at S1. The partner wireless carrier network 104 may send the authentication request 112 following a detection that the user device 106 is attempting to connect to the partner wireless carrier network 104. The network element of the partner wireless carrier network 104 that participates in the device authentication procedure 108 and the device registration procedure 110 may vary depending on the type of roaming telecommunication service that the partner wireless carrier network 104 is providing to the user device 106. In one scenario, when the user device 106 is being authenticated to use 2G or 3G circuit-switched telecommunication services (e.g., voice calling) provided by the partner wireless carrier network 104, an MSC or a VLR of the partner wireless carrier network 104 may participate in the device authentication procedure 108. In another scenario, when the user device 106 is being authenticated to use 3G packet-switched telecommunication services (e.g., data upload/download) provided by the partner wireless carrier network 104, an SGSN of the partner wireless carrier network 104 may participate in the device authentication procedure 108. In an additional scenario, when the user device 106 is being authenticated to use 4G or LTE telecommunication services provided by the partner wireless carrier network 104, an MME of the partner wireless carrier network 104 may participate in the device authentication procedure 108.

The authentication request 112 for the user device 106 may be received by a subscriber information entity 114 of the home wireless carrier network 102. For example, when the network element of the partner wireless carrier network 104 that sent the authentication request 112 is a network element that supports 2G or 3G wireless communication, the authentication request 112 may be received and processed by an HLR of the home wireless carrier network 102. However, when the network element of the partner wireless carrier network 104 that sent the authentication request 112 is a network element that supports LTE or 4G wireless communication, the authentication request 112 may be received and processed by an HSS of the home wireless carrier network 102. However, in some instances, the SGSN of the partner wireless carrier network 104 may be configured to communicate with an HSS of the home wireless carrier network 102. In such instances, the SGSN of the partner wireless carrier network 104 may send the authentication request 112 to the HSS instead of the HLR of the home wireless carrier network 102 for processing.

In at least one embodiment, the authentication request 112 may include a network element identifier 116 of a network element in the partner wireless carrier network 104 that is sending the authentication request 112, a device identifier of the user device 106, and an authentication value that the partner wireless carrier network 104 received from the user device 106. For example, the device identifier may be an International Mobile Equipment Identity (IMEI), an Embedded Universal Integrated Circuit Card Identifier (EID), an Integrated Circuit card Identifier (ICCID), or another identifier that uniquely identifies the user device 106. The authentication value may be a value that is computed by user device 106 based on a random number that the home wireless carrier network 102 generated for authenticating the user device 106 and sent to the partner wireless carrier network 104, and which the partner wireless carrier network 104 wirelessly forwarded to the user device 106. The user device 106 may compute the authentication value by encrypting the random number using a subscriber authentication key that is stored in a secure memory, e.g., a subscriber identity module (SIM) or an embedded Subscriber Identity Module (eSIM), as well as an authentication algorithm that is stored in the secure memory or some other memory of the user device 106. A duplicate copy of the subscriber authentication key may be stored in a subscriber authentication key database maintained by the home wireless carrier network 102.

At S2, the subscriber information entity 114 may send an authentication response 118 to the partner wireless carrier network 104. The authentication response 118 may indicate to the partner wireless carrier network 104 whether or not the user device 106 is authenticated as being a subscriber device of the home wireless carrier network 102 based on the authentication value included in the authentication request 112. In at least one embodiment, the subscriber information entity 114 may use the device identifier in the authentication request 112 to retrieve a corresponding subscriber authentication key that is pre-stored in the subscriber authentication key database. The subscriber authentication key and the random number initially generated for authenticating the user device 106 may be encrypted by the home wireless carrier network 102 via an identical authentication algorithm as used by the user device 106 to compute a validation authentication value. The validation authentication value is then compared by the subscriber information entity 114 to the authentication value received via the authentication request 112. If the validation authentication value matches the authentication value received via the authentication request 112, the home wireless carrier network 102 may determine that the user device 106 is authenticated as a subscriber device of the home wireless carrier network 102. However, If the validation authentication value does not match the authentication value received via the authentication request 112, the subscriber information entity 114 may determine that the user device 106 is not authenticated. At S3, if the subscriber information entity 114 determines that the user device 106 is authenticated as a subscriber device of the home wireless carrier network 102, the subscriber information entity 114 may retrieve the network element identifier 116 from the authentication request 112 and store the network element identifier 116 of the network element in a subscriber profile associated with the user device. Otherwise, no such storage of the network element identifier 116 is performed by the subscriber information entity.

Subsequently, during the device registration procedure 110, a network element of the partner wireless carrier network 104 may send a registration request 120 to the home wireless carrier network 102 at S4. In one scenario, the registration request 120 may be sent by an MSC or a VLR of the partner wireless carrier network 104 that supports 2G or 3G circuit-switched telecommunication services. In another scenario, the registration request 120 may be sent by an SGSN of the partner wireless carrier network 104 that supports 3G packet-switched telecommunication services. In an additional scenario, the registration request 120 may be sent by an MME of the partner wireless carrier network 104 that supports 4G or LTE telecommunication services. Complementarily, when the network element of the partner wireless carrier network that sent the registration request 120 is a network element that supports 2G or 3G wireless communication, the registration request 120 may be received and processed by the HLR of the home wireless carrier network 102. However, when the network element of the partner wireless carrier network that sent the registration request 120 is a network element that supports LTE or 4G wireless communication, the registration request 120 may be received and processed by an HSS of the home wireless carrier network 102.

The registration request 120 may include a network element identifier 122 of a network element that sent the registration request 120 and a device identifier of the user device 106. At S5, the subscriber information entity 114 may determine whether the network element identifier 122 matches the network element identifier 116 stored in the subscriber profile associated with the user device 106. Thus, if the network element identifier 122 matches the network element identifier 116, the subscriber information entity 114 may send a registration response 124 to the network element of the partner wireless carrier network 104 that sent the registration request 120 at S6, in which the registration response 124 may indicate that the user device is successfully registered with the home wireless carrier network 102. The registration response 124 may include subscriber profile information associated with the user device. For example, the subscriber profile information may include settings for service parameters, service restrictions, service billing, and/or so forth. The data that is sent via the registration response 124 may be specified by 3GPP standards that define the data and the corresponding data values that an HLR or an HSS can send to an MSC, a VLR, an SGSN, or an MME. For example, such settings may be for outgoing calls, call waiting, call forwarding, outgoing text messages, incoming text messages, Quality of Service (QoS) parameters for data upload/download, and/or so forth. The subscriber profile information may be retrieved by the subscriber information entity 114 from the subscriber profile associated with the user device 106. On the other hand, if the subscriber information entity 114 determines that the network element identifier 122 does not match the network element identifier 116, the subscriber information entity 114 may reject the registration request 120. For example, the subscriber information entity 114 may send a registration answer to the registration request 120 indicating that the user device 106 cannot be registered.

In other embodiments, instead of determining whether the network element identifier 122 matches the network element identifier 116, the subscriber information entity 114 may determine whether the network element identifier 122 at least partially matches the network element identifier 116. Thus, if the subscriber information entity 114 determines that the network element identifier 122 at least partially matches the network element identifier 116, the subscriber information entity 114 may send the registration response 124 to the network element of the partner wireless carrier network 104, in which the registration response includes subscriber profile information associated with the user device. On the other hand, if the subscriber information entity 114 determines that the network element identifier 122 does not at least partially match the network element identifier 116, the subscriber information entity may reject the registration request.

In one example, each of the network element identifier 116 and the network element identifier 122 may be a global title in the form of a numerical string that includes a country code, a network operator code, and a network element code when the corresponding network element is a network element that supports 2G or 3G telecommunication service. An example of a global title for a network element may be 192-292-239283, in which the "192" is the country code, the "292" is the network operator code, and the "239283" is the network element code. Accordingly, the subscriber information entity 114 may determine that there is a partial match between the first and second network element identifiers when the respective country codes in the network element identifiers match and the respective network operator code in the network element identifiers match, even without a matching of the respective network element codes in the network element identifiers.

In another example, each of the network element identifier 116 and the network element identifier 122 may be a host identifier that includes a realm name and a network element name when the corresponding network element is a network element that supports LTE or 4G telecommunication service. An example of a host identifier for a network element may be "mme-tmo-us.mme.epc.mnc260.mcc310.3gppnetwork.org", in which the latter portion "epc.mnc260.mcc310.3gppnetwork.org" is the realm name, and the "mme-tmo-us.mme" is the network element name. Accordingly, the subscriber information entity 114 may determine that there is a partial match between the first and second network element identifiers when the respective realm names in the network element identifiers match even without a matching of the respective element names in the network element identifiers.

In some alternative embodiments, the subscriber information entity 114 may not initially reject the registration request when the network element identifier 122 fails to match or at least partially match the network element identifier 116. Instead, the subscriber information entity 114 may determine whether the network identifier information included in the network element identifier 122 identifies the wireless carrier network as a trusted partner wireless carrier network. For example, the network identifier information may be the network operator code in a global title or the realm name in a host identifier. The network identifier information may be compared by the subscriber information entity 114 to a list of wireless carrier network identities (e.g., operator code or realm name) belonging to trusted partner wireless carrier networks. Accordingly, if the subscriber information entity 114 determines from the network identifier information of the network element identifier 122 that the registration request originated from a trusted partner wireless carrier network, the subscriber information entity 114 may send a registration response to the network element of the partner wireless carrier network 104. Otherwise, the subscriber information entity 114 may reject the registration request.

Example Subscriber Information Entity

Figure 2:
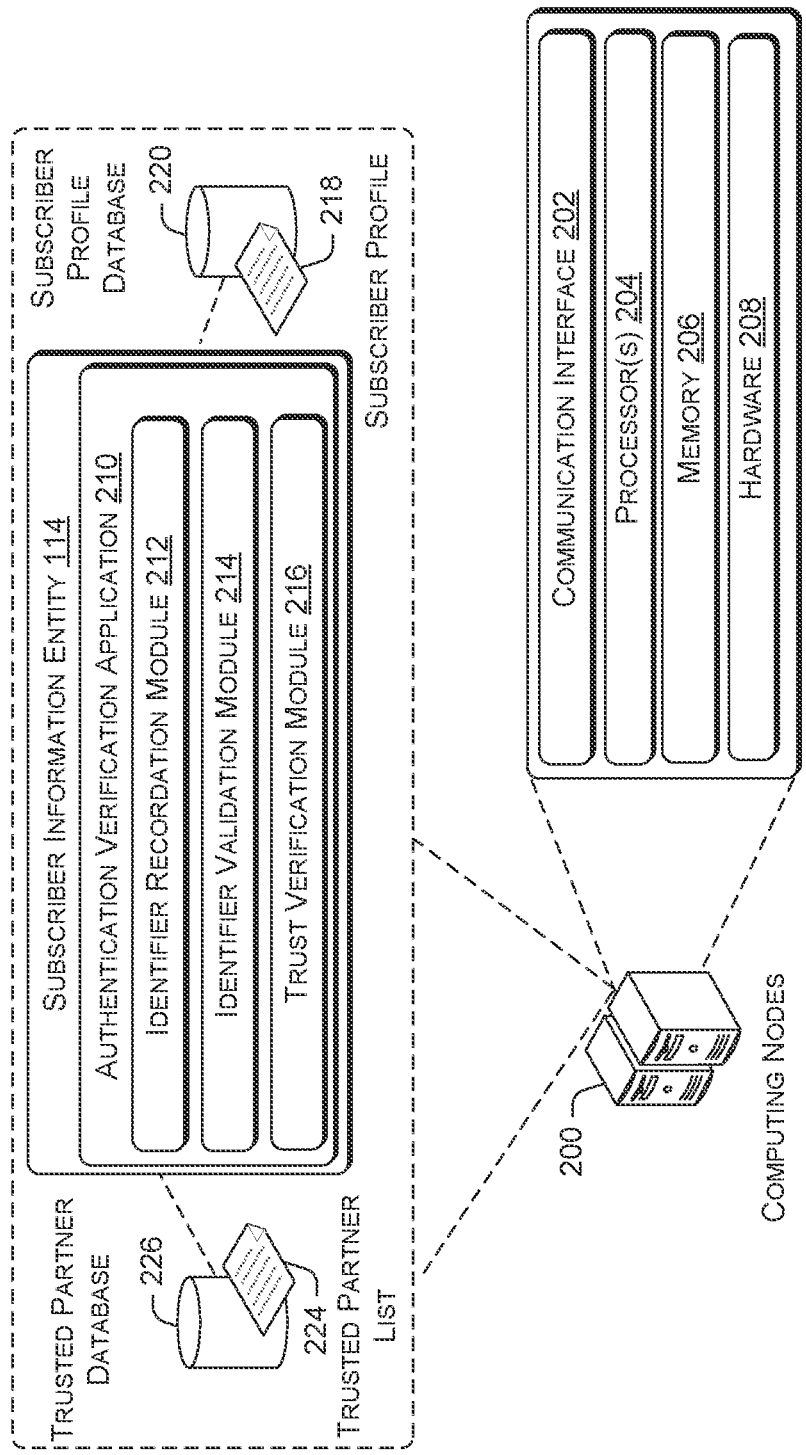
FIG. 2 is a block diagram showing various components of an authentication verification application that performs device authentication verification for device registration.

FIG. 2 is a block diagram showing various components of an authentication verification application that performs device authentication verification for device registration. The computing nodes 200 may include a communication interface 202, one or more processors 204, memory 206, and hardware 208. The communication interface 202 may include wireless and/or wired communication components that enable the computing nodes 200 to transmit data to and receive data from other networked devices. The hardware 208 may include additional user interfaces, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing nodes 200 or components thereof may be virtual computing devices in the form of virtual machines or software containers that are hosted in a computing cloud.

The computing nodes 200 may implement various back-end services and network components of the home wireless carrier network 102, such as a subscriber information entity 114. In various embodiments, the subscriber information entity 114 may be an HLR or an HSS. The implementation involves the execution of software, applications, and/or modules that include routines, program instructions, code segments, objects, and/or data structures that perform particular tasks or implement particular abstract data types. The subscriber information entity 114 may use an authentication verification application 210 to perform device authentication verification for device registration. The authentication verification application 210 may include an identifier recordation module 212, an identifier validation module 214, and a trust verification module 216.

The identifier recordation module 212 may record the network element identifier of a network element that sent an authentication request for a user device in a subscriber profile (e.g., subscriber profile 218) associated with the user device. The identifier recordation module 212 may perform such recordation for the user device following a successful authentication of the user device as a subscriber device of the home wireless carrier network 102 by a device authentication function of the subscriber information entity 114. The subscriber profile may be stored in a subscriber profile database 220 that is maintained by the subscriber information entity 114. In various embodiments, the identifier recordation module 212 may extract the network element identifier from the authentication request sent by the network element, and store the network element identifier as the identifier of the last network element that sent an authentication request for the user device to the subscriber information entity 114. In some instances, the recordation of the network element identifier in the subscriber profile may overwrite an existing network element identifier of a previous network element that sent a corresponding authentication for the user device to the subscriber information entity 114.

The identifier validation module 214 may compare a network element identifier that is associated with an incoming registration request for a user device with a network element identifier that is stored in the subscriber profile for the user device. In some embodiments, the identifier validation module 214 may direct the subscriber information entity 114 to provide a registration response that includes subscriber profile information for the user device to the requesting network element when there is a match between the two network element identifiers. Otherwise, the identifier validation module 214 may direct the subscriber information entity 114 to reject the registration request. In other embodiments, the identifier validation module 214 may direct the subscriber information entity 114 to provide a registration response that includes subscriber profile information for the user device to the requesting network element when there is at least a partial match between the two network element identifiers. Otherwise, the identifier validation module 214 may direct the subscriber information entity 114 to reject the registration request. In still other embodiments, the failure to match or at least partially match the two network element identifiers by the identifier validation module 214 may trigger the trust verification module 216 to perform a trusted partner wireless carrier network validation rather than reject the registration response. During the trusted partner wireless carrier network validation, the trust verification module 216 may be configured to further determine whether the network identifier information in the network element identifier of the registration request matches the network identifier information of a wireless carrier network in a trusted partner list 224 of trusted partner wireless carrier networks. The trusted partner list 224 may be stored in a trusted partner database 226. Accordingly, if the trust verification module 216 determines that the network identifier information matches identifier information of a trusted partner wireless carrier network in the list, the trust verification module 216 may direct the subscriber information entity 114 to provide a registration response that includes subscriber profile information for the user device to the request network element. Otherwise, the trust verification module 216 may reject the registration request.

Example Processes

Figure 3:
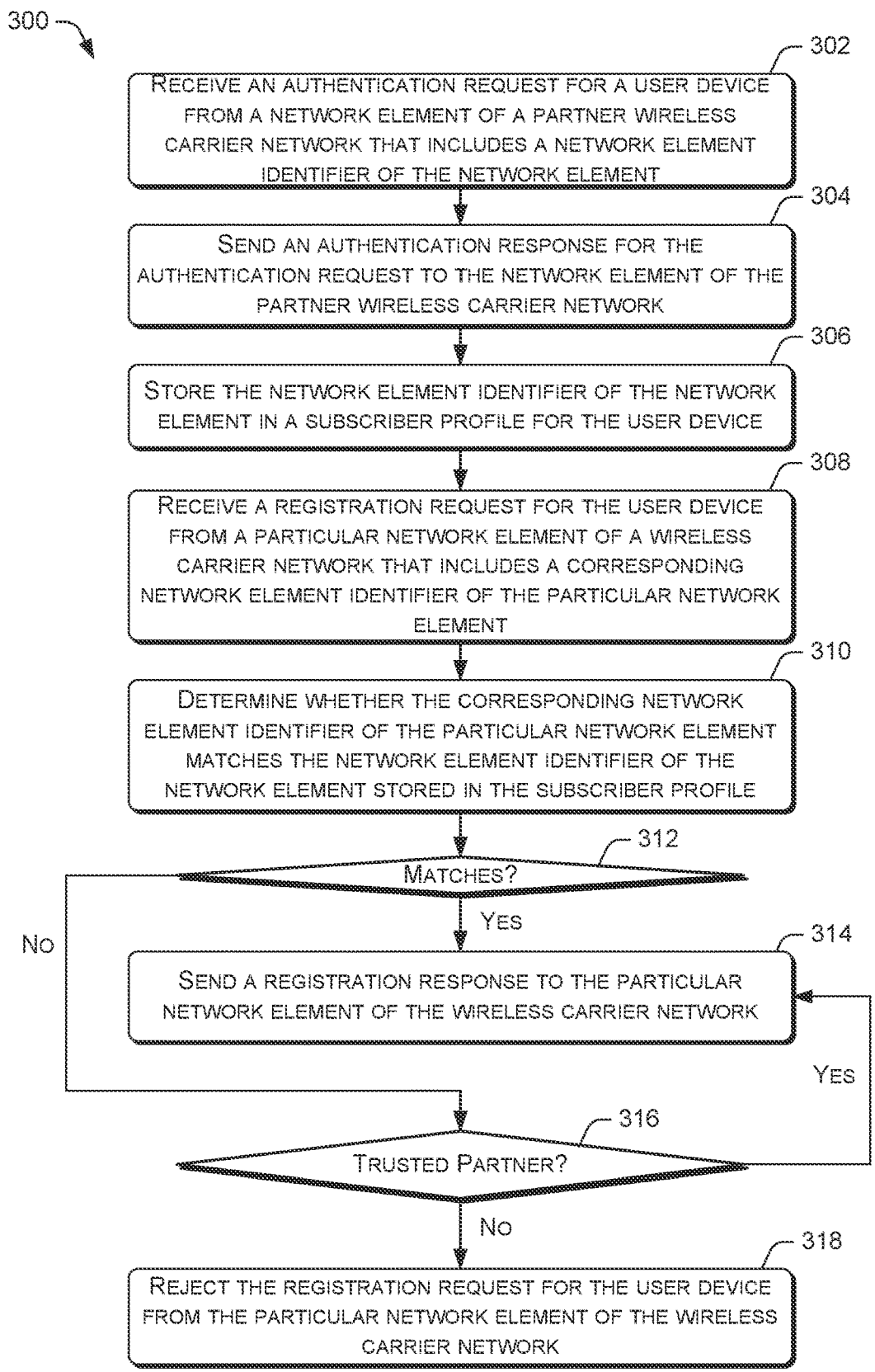
FIG. 3 is a flow diagram of a first example process for performing device authentication verification for device registration that is based on exact network element identifier matching.
Figure 4:
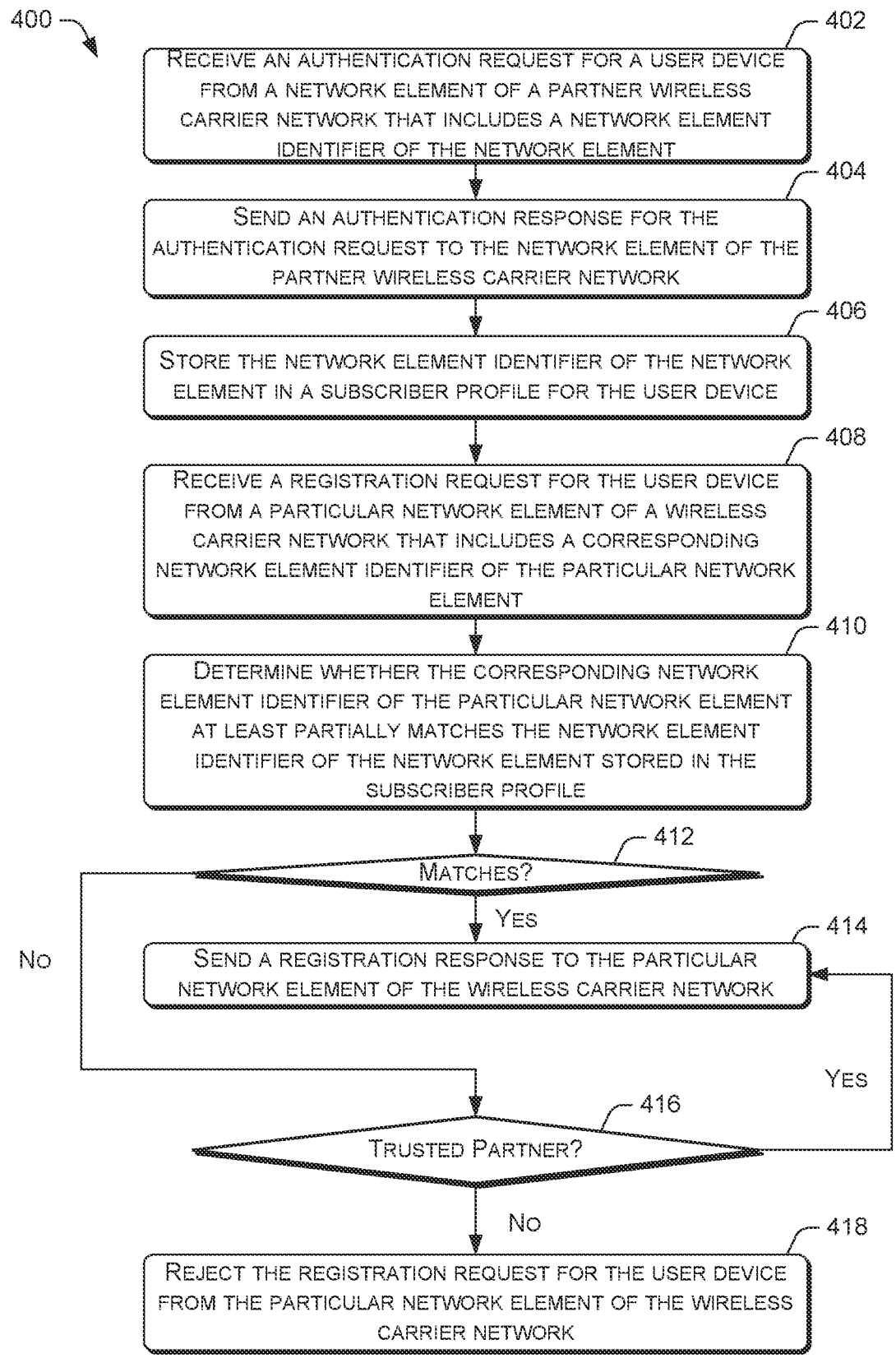
FIG. 4 is a flow diagram of a second example process for performing device authentication verification for device registration that is based on partial network element identifier matching.

FIGS. 3 and 4 present illustrative processes 300 and 400 for performing device authentication verification for device registration. Each of the processes 300 and 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300 and 400 are described with reference to the architecture 100 of FIG. 1.

FIG. 3 is a flow diagram of a first example process 300 for performing device authentication verification for device registration that is based on exact network element identifier matching. At block 302, the subscriber information entity of a home wireless carrier network 102 may receive an authentication request for a user device from a network element of a partner wireless carrier network 104, in which the authentication request includes a network element identifier of the network element. In various embodiments, the subscriber information entity may be an HLR or an HSS depending on the type of the network element that sent the authentication request. At block 304, the subscriber information entity may send an authentication response for the authentication request to the network element of the partner wireless carrier network. In some embodiments, the authentication response may indicate that the user device is authenticated as being a subscriber device of the home wireless carrier network 102.

At block 306, the subscriber information entity may store the network element identifier of the network element in a subscriber profile for the user device. In various embodiments, the subscriber information entity may store the network element identifier when the user device is authenticated as being a subscriber device of the home wireless carrier network 102. The subscriber profile may be stored in a subscriber profile database maintained by the subscriber information entity. At block 308, the subscriber information entity may receive a registration request for the user device from a particular network element of a wireless carrier network that includes a corresponding network element identifier of the particular network element.

At block 310, the subscriber information entity may determine whether the corresponding network element identifier of the particular network element matches the network element identifier of the network element stored in the subscriber profile. At decision block 312, if the corresponding network element identifier matches the network element identifier of the network element, ("yes" at decision block 312), the process 300 may proceed to block 314. At block 314, the subscriber information entity may send a registration response to the particular network element of the wireless carrier network. In various embodiments, the registration response may include subscriber profile information associated with the user device. For example, the subscriber profile information may include settings for service parameters, service restrictions, service billing, and/or so forth. For example, such settings may be for outgoing calls, call waiting, call forwarding, outgoing text messages, incoming text messages, SM Quality of Service (QoS) parameters for data upload/download, and/or so forth.

However, if the corresponding network element identifier does not match the network element identifier of the network element, ("no" at decision block 312), the process 300 may proceed to decision block 316. At decision block 316, the subscriber information entity may determine whether the wireless carrier network that sent the registration request is a trusted partner wireless carrier network. In various embodiments, the subscriber information entity may use the network identifier information included in the corresponding network element identifier to determine whether the wireless carrier network is a trusted partner wireless carrier network. For example, the network identifier information may be the network operator code in a global title or the realm name in a host identifier that is compared to the network identifier information in a list of trusted partner wireless carrier networks.

Thus, if the wireless carrier network is a trusted partner wireless carrier network ("yes" at decision block 316), the process 300 may loop back to block 314. However, if the wireless carrier network is not a trusted partner wireless carrier network ("no" at decision block 316), the process 300 may proceed to block 318. At block 318, the subscriber information entity may reject the registration request from the user device from the particular network element of the wireless carrier network. In alternative embodiments, the subscriber information entity may forgo the determination of whether the wireless carrier network is a trusted partner wireless carrier network when the corresponding network element identifier of the particular network element does not match the network element identifier of the network. Instead, the subscriber information entity may simply reject the registration request.

FIG. 4 is a flow diagram of a second example process 400 for performing device authentication verification for device registration that is based on partial network element identifier matching. At block 402, the subscriber information entity of a home wireless carrier network 102 may receive an authentication request for a user device from a network element of a partner wireless carrier network 104, in which the authentication request includes a network element identifier of the network element. In various embodiments, the subscriber information entity may be an HLR or an HSS depending on the type of the network element that sent the authentication request. At block 404, the subscriber information entity may send an authentication response for the authentication request to the network element of the partner wireless carrier network. In some embodiments, the authentication response may indicate that the user device is authenticated as being a subscriber device of the home wireless carrier network 102.

At block 406, the subscriber information entity may store the network element identifier of the network element in a subscriber profile for the user device. In various embodiments, the subscriber information entity may store the network element identifier when the user device is authenticated as being a subscriber device of the home wireless carrier network 102. The subscriber profile may be stored in a subscriber profile database maintained by the subscriber information entity. At block 408, the subscriber information entity may receive a registration request for the user device from a particular network element of a wireless carrier network that includes a corresponding network element identifier of the particular network element.

At block 410, the subscriber information entity may determine whether the corresponding network element identifier of the particular network element at least partially matches the network element identifier of the network element stored in the subscriber profile. In one example, the subscriber information entity may determine that there is a partial match between the corresponding network identifier and the network element identifier when the respective country codes match and the respective network operator codes match, even without a matching of the respective network element codes. In another example, the subscriber information entity may determine that there is a partial match between the corresponding network element and the network element identifier when the respective realm names match even without a matching of the respective element names.

At decision block 412, if the corresponding network element identifier at least partially matches the network element identifier of the network element, ("yes" at decision block 412), the process 400 may proceed to block 414. At block 414, the subscriber information entity may send a registration response to the particular network element of the wireless carrier network. In various embodiments, the registration response may include subscriber profile information associated with the user device. For example, the subscriber profile information may include settings for service parameters, service restrictions, service billing, and/or so forth. For example, such settings may be for outgoing calls, call waiting, call forwarding, outgoing text messages, incoming text messages, SM Quality of Service (QoS) parameters for data upload/download, and/or so forth.

However, if the corresponding network element identifier does not at least partially match the network element identifier of the network element, ("no" at decision block 412), the process 400 may proceed to decision block 416. At decision block 416, the subscriber information entity may determine whether the wireless carrier network that sent the registration request is a trusted partner wireless carrier network. In various embodiments, the subscriber information entity may use the network identifier information included in the corresponding network element identifier to determine whether the wireless carrier network is a trusted partner wireless carrier network. For example, the network identifier information may be the network operator code in a global title or the realm name in a host identifier that is compared to the network identifier information in a list of trusted partner wireless carrier networks.

Thus, if the wireless carrier network is a trusted partner wireless carrier network ("yes" at decision block 416) the process 400 may loop back to block 414. However, if the wireless carrier network is not a trusted partner wireless carrier network ("no" at decision block 416), the process 400 may proceed to block 418. At block 418, the subscriber information entity may reject the registration request from the user device from the particular network element of the wireless carrier network. In alternative embodiments, the subscriber information entity may forgo the determination of whether the wireless carrier network is a trusted partner wireless carrier network when the corresponding network element identifier of the particular network element does not match the network element identifier of the network. Instead, the subscriber information entity may simply reject the registration request.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a home wireless carrier network storing computer-executable instructions that upon execution cause one or more processors to perform acts comprising:

receiving, at a subscriber information entity of the home wireless carrier network, an authentication request for a user device from a network element of a partner wireless carrier network, the authentication request including a network element identifier of the network element;

sending, from the subscriber information entity, an authentication response for the authentication request to the network element of the partner wireless carrier network;

storing the network element identifier of the network element in the partner wireless carrier network as received via the authentication request for the user device in a subscriber profile for the user device at the home wireless carrier network;

receiving, at the subscriber information entity, a registration request for the user device from a particular network element of a wireless carrier network, the registration request including a corresponding network element identifier of the particular network element; and in response to determining, at the subscriber information entity, that the corresponding network element identifier of the particular network element matches the network element identifier of the network element stored in the subscriber profile, sending a registration response to the particular network element of the wireless carrier network.

2. The one or more non-transitory computer-readable media of claim 1, wherein the acts further comprise in response to determining, at the subscriber information entity, that the corresponding network element identifier does not match the network element identifier of the network element stored in the subscriber profile, rejecting the registration request for the user device from the particular network element of the wireless carrier network.

3. The one or more non-transitory computer-readable media of claim 1, wherein each of the network element or the particular network element is a circuit-switching network element or a packet-switching network element that supports 2G or 3G wireless telecommunication, and wherein the circuit-switching network element includes a Mobile Switching Center (MSC) or a Visitor Location Register (VLR), and the packet-switching network element includes a Serving General Packet Radio Service Support Node (SGSN).

4. The one or more non-transitory computer-readable media of claim 1, wherein each of the network element or the particular network element includes a Mobility Management Entity (MME) that supports 4G or LTE wireless telecommunication.

5. The one or more non-transitory computer-readable media of claim 1, wherein the subscriber information entity includes a Home Location Register (HLR) that supports 2G or 3G wireless telecommunication or a Home Subscriber Server (HSS) that supports 4G or LTE wireless telecommunication.

6. The one or more non-transitory computer-readable media of claim 1, wherein the network element identifier or the corresponding network element identifier is a global title of a 2G or 3G network element.

7. The one or more non-transitory computer-readable media of claim 1, wherein the network element identifier or the corresponding network element identifier is a host identifier of a 4G or LTE network element.

8. The one or more non-transitory computer-readable media of claim 1, wherein the registration response includes subscriber profile information associated with the user device.

9. The one or more non-transitory computer-readable media of claim 1, wherein the storing includes storing the network element identifier of the network element in the subscriber profile for the user device when the user device is authenticated as being a subscriber device of the home wireless carrier network.

10. A computer-implemented method, comprising:
receiving, at a subscriber information entity of a home wireless carrier network, an authentication request for a user device from a network element of a partner wireless carrier network, the authentication request including a network element identifier of the network element;
sending, from the subscriber information entity, an authentication response for the authentication request to the network element of the partner wireless carrier network;
storing the network element identifier of the network element in the partner wireless carrier network as received via the authentication request for the user device in a subscriber profile for the user device at the home wireless carrier network;
receiving, at the subscriber information entity, a registration request for the user device from a particular network element of a wireless carrier network, the registration request including a corresponding network element identifier of the particular network element; and
in response to determining, at the subscriber information entity, that the corresponding network element identifier of the particular network element at least partially matches the network element identifier of the network element stored in the subscriber profile, sending a registration response to the particular network element of the wireless carrier network.

11. The computer-implemented method of claim 10, further comprising in response to determining, at the subscriber information entity, that the corresponding network element identifier does not at least partially match the network element identifier of the network element stored in the subscriber profile:
determining based on network identifier information included in the corresponding network element identifier whether the wireless carrier network is a trusted partner wireless carrier network;
in response to determining that the wireless carrier network is a trusted partner wireless carrier network, sending a registration response to the particular network element of the wireless carrier network; and
in response to determining that the wireless carrier network is not a trusted partner wireless carrier network, rejecting the registration request for the user device from the particular network element of the wireless carrier network.

12. The computer-implemented method of claim 10, wherein each of the network element identifier of the network element and the corresponding network element identifier of the particular network element is a global title of a 2G or 3G network element, the global title of the network element including a first country code, a first network operator code, and a first network element code, and the global title of the particular network element including a second country code, a second network operator code, and a second network element code, and wherein the corresponding network element identifier at least partially matches the network element identifier when the first country code matches the second country code and the first network operator code matches the second network operator code, without the first network element code matching the second network element code.

13. The computer-implemented method of claim 10, wherein each of the network element identifier of the network element and the corresponding network element identifier of the particular network element is a host identifier of a 4G or LTE network element, the host identifier of the network element including a first realm name and a first element name, and the host identifier of the particular network element including a second realm name and second element name, and wherein the corresponding network element identifier at least partially matches the network element identifier when the first realm name matches the second realm name in without the first element name matching the second element name.

14. The computer-implemented method of claim 10, wherein each of the network element or the particular network element is a circuit-switching network element or a packet-switching network element that supports 2G or 3G wireless telecommunication, and wherein the circuit-switching network element includes a Mobile Switching Center (MSC) or a Visitor Location Register (VLR), and the packet-switching network element includes a Serving General Packet Radio Service Support Node (SGSN).

15. The computer-implemented method of claim 10, wherein each of the network element or the particular network element includes a Mobility Management Entity (MME) that supports 4G or LTE wireless telecommunication.

16. The computer-implemented method of claim 10, wherein the subscriber information entity includes a Home Location Register (HLR) that supports 2G or 3G wireless telecommunication or a Home Subscriber Server (HSS) that supports 4G or LTE wireless telecommunication.

17. The computer-implemented method of claim 10, wherein the registration response includes subscriber profile information associated with the user device.

18. The computer-implemented method of claim 10, wherein the storing includes storing the network element identifier of the network element in the subscriber profile for the user device when the user device is authenticated as being a subscriber device of the home wireless carrier network.

19. A subscriber information entity of a home wireless carrier network, comprising:
one or more processors; and
memory including a plurality of computer-executable components that are executable by the one or more processors to perform a plurality of actions, the plurality of actions comprising:
receiving, at the subscriber information entity, an authentication request for a user device from a network element of a partner wireless carrier network, the authentication request including a network element identifier of the network element;

sending, from the subscriber information entity, an authentication response for the authentication request to the network element of the partner wireless carrier network;

storing the network element identifier of the network element in the partner wireless carrier network as received via the authentication request for the user device in a subscriber profile for the user device at the home wireless carrier network;

receiving, at the subscriber information entity, a registration request for the user device from a particular network element of a wireless carrier network, the registration request including a corresponding network element identifier of the particular network element; and in response to determining, at the subscriber information entity, that the corresponding network element identifier of the particular network element at least partially matches the network element identifier of the network element stored in the subscriber profile, sending a registration response to the particular network element of the wireless carrier network, wherein each of the network element identifier and the corresponding network element identifier is a global title that includes a corresponding country code, a corresponding network operator code, and a corresponding network element code, or is a host identifier that includes a corresponding realm name and a corresponding element name.

20. The subscriber information entity of claim 19, wherein the plurality of actions further comprise in response to determining, at the subscriber information entity, that the corresponding network element identifier does not match the network element identifier of the network element stored in the subscriber profile, rejecting the registration request for the user device from the particular network element of the wireless carrier network.

\* \* \* \* \*